(12) United States Patent
Harr et al.

(10) Patent No.: US 9,074,610 B2
(45) Date of Patent: Jul. 7, 2015

(54) TANK MODULE FOR A LIQUID TANK

(75) Inventors: Jürgen Harr, Moetzingen (DE); Robert Fuchs, Karlsbad (DE)

(73) Assignee: SEUFFER GMBH & CO. KG, Calw (DE)

( * ) Notice: Subject to any disclaimer, the term of this patent is extended or adjusted under 35 U.S.C. 154(b) by 106 days.

(21) Appl. No.: 13/704,738

(22) PCT Filed: Jun. 22, 2011

(86) PCT No.: PCT/EP2011/003095
§ 371 (c)(1),
(2), (4) Date: Feb. 13, 2013

(87) PCT Pub. No.: WO2011/160836
PCT Pub. Date: Dec. 29, 2011

(65) Prior Publication Data
US 2013/0263938 A1    Oct. 10, 2013

(30) Foreign Application Priority Data

Jun. 22, 2010   (DE) .......................... 10 2010 024 554

(51) Int. Cl.
| | |
|---|---|
| F01N 3/20 | (2006.01) |
| B01D 35/027 | (2006.01) |
| B01D 35/26 | (2006.01) |
| F04D 29/58 | (2006.01) |
| F02M 37/22 | (2006.01) |
| F01N 3/08 | (2006.01) |

(52) U.S. Cl.
CPC ............ *F04D 29/588* (2013.01); *B01D 35/027* (2013.01); *B01D 35/26* (2013.01); *F01N 3/2066* (2013.01); *F01N 2610/1406* (2013.01); *F01N 2610/1426* (2013.01); *F01N 2610/1433* (2013.01); *F02M 37/223* (2013.01); *Y02T 10/16* (2013.01); *Y02T 10/24* (2013.01); *F01N 3/08* (2013.01); *F01N 2610/10* (2013.01)

(58) Field of Classification Search
CPC .................. B01D 35/027; B01D 35/26; F01N 2610/1433; F01N 2610/1426; Y02T 10/24; F04D 29/588
USPC ............... 137/571, 565.15, 565.16, 585, 544, 137/341; 123/509
See application file for complete search history.

(56) References Cited

U.S. PATENT DOCUMENTS

| | | | | | |
|---|---|---|---|---|---|
| 2,260,946 | A | * | 10/1941 | Korte et al. ................... | 415/206 |
| 5,988,213 | A | * | 11/1999 | Yoshioka ....................... | 137/590 |
| 6,063,350 | A | * | 5/2000 | Tarabulski et al. .......... | 423/239.1 |

(Continued)

FOREIGN PATENT DOCUMENTS

| | | |
|---|---|---|
| DE | 10 2007 057190 | 6/2008 |
| EP | 1043495 | 10/2000 |
| WO | 2007141312 | 12/2007 |

(Continued)

*Primary Examiner* — Atif Chaudry
(74) *Attorney, Agent, or Firm* — Ware, Fressola, Maguire & Barber LLP

(57) ABSTRACT

The present invention concerns a tank module for insertion into an opening region (4a) of a tank (1) for storing a fluid (2) and comprises a housing (5) which can be inserted into a lower part of the tank (1) and has an outlet region (9), a filter device (14) for filtering the fluid (2) in the tank (1), and a pump device (15) arranged in the outlet region for conveying the fluid (2) to the outlet region (9), wherein the pump device (15) is arranged at least partially within the filter device (14).

13 Claims, 3 Drawing Sheets

(56) References Cited

U.S. PATENT DOCUMENTS

2006/0048756 A1* 3/2006 Ikeya .............................. 123/509
2007/0215122 A1 9/2007 Nakagawa et al.
2012/0051955 A1* 3/2012 Hadar ........................ 417/410.3

FOREIGN PATENT DOCUMENTS

| WO | 2009007405 | 1/2009 | |
| WO | 2010037703 | 4/2010 | |
| WO | WO 2010037703 A2 * | 4/2010 | ................ F04C 2/10 |

* cited by examiner

TANK MODULE FOR A LIQUID TANK

CROSS REFERENCE TO RELATED APPLICATIONS

This application is the U.S. National Stage of International Application Number PCT/EP2011/003095 filed on Jun. 22, 2011 which in turn claims priority under 35 USC §119 to German Patent Application No. 10 2010 024 554.2 filed on Jun. 22, 2010, which is hereby incorporated by reference.

TECHNICAL FIELD

The present invention concerns a tank module for a liquid tank and in particular for a tank for storing a fluid reducing agent for reducing harmful components in the exhaust gas of internal combustion engines.

BACKGROUND OF THE INVENTION

Due to the combustion of a fuel in internal combustion engines the exhaust gases from combustion contain environmentally polluting substances so that at least partial cleaning of the exhaust gases is required. Particularly in the case of vehicles operated with diesel fuel ever more severe legal requirements in, regard to the composition of the exhaust gases mean that essentially the proportion of nitrogen oxides (NOx) must be considerably reduced in normal operation of the internal combustion engine.

In connection with the operation of diesel internal combustion engines, a method is known in which gaseous ammonia ($NH_3$) is introduced as a reducing agent into the flow of exhaust gases to reduce the content of nitrogen oxides in the exhaust gas, and reacts with the nitrogen oxides in the exhaust gas. In that case the gaseous ammonia reacts with the nitrogen oxides of the exhaust gas selectively to give nitrogen and water.

In the application in the area of internal combustion engines for vehicles an aqueous urea solution is used to prepare ammonia, the urea solution being carried along in the vehicle in its own tank. Accordingly, in addition to the fuel for the internal combustion engine however the aqueous urea solution is stored in a smaller amount and in a separate tank.

In regard to operation of the vehicle in conjunction with exhaust gas cleaning by means of the aqueous urea solution, it is to be noted at winter temperatures considerably below 0° C. that the aqueous urea solution separates out in flakes or freezes at about −11° C. The special tank for the aqueous urea solution therefore requires a heating system so that at low temperatures at least a part of the urea solution in the tank is kept fluid in the short term or is liquefied so that it can be introduced into the exhaust gas flow.

With a suitable arrangement of the separate tank for the fluid reducing agent in the form of the aqueous urea solution, there is the possibility, for suitably taking off the solution from the tank, of causing the fluid to be discharged by way of a pressure head in conjunction with control of a valve. In that connection however it is difficult to ensure an uninterrupted feed in an adequate amount to the exhaust gas installation, in dependence on the operating conditions of the internal combustion engine.

To take off the fluid reducing agent therefore it is possible to use a pump, by means of which the fluid is conveyed from the tank to the exhaust gas installation of the internal combustion engine.

DE 10 2007 050 272 A1 discloses a tank for the storage of a fluid reducing agent, wherein the reducing agent in the form of an aqueous urea solution is heated by means of a heating device at predetermined locations in the tank in which there is provided an additional internal container. The urea solution is taken off by means of a suitable suction line and in conjunction with an associated return line which both dip into the reducing agent disposed in a sump. Thermal coupling of the return line to the heating device is provided for positively influencing thawing of the aqueous urea solution which has frozen under corresponding ambient conditions, at low temperatures. The suction line leads to a conveyor module above the tank, the conveyor module having a pump for conveying the reducing agent from the sump. The conveyor module on the top side of the tank closes off the tank. A filter is arranged at the mouth opening of the suction line in the sump.

In addition DE 10 2006 027 478 A1 discloses a vehicle tank for a fluid reducing agent (for example an aqueous urea solution), wherein the tank has a plurality of chambers and provided in one of the chambers in the form of an internal container is an integrated electric heating means in conjunction with a suction line for taking off the fluid reducing agent. The fluid reducing agent is sucked off by a conveyor module arranged above the tank. In particular a pump is provided in the conveyor module and this arrangement ensures, in conjunction with a further conduit from the fluid reducing agent to the pump, that the pump cannot run dry in normal operation and with a low filling level for the reducing agent.

Such arrangements of tank devices for storing for example a fluid reducing agent with a heating device and a pump device require considerable structural complication and expenditure as a large number of individual parts have to be assembled. The various components of the overall arrangement within and outside the tank (in particular above the tank) result in an enlarged structural volume so that it is not possible to achieve a compact structure in conjunction with easier and thus inexpensive manufacture as in particular the assembly complication and expenditure is considerable and has to be adapted to the factors involved in a particular use.

SUMMARY OF THE INVENTION

Therefore the object of the present invention is to so design a tank module for a liquid tank of the kind set forth in the opening part of this specification, such that on the one hand the liquid can be taken off in the desired amount and with a continuous and controllable volume flow and on the other hand a compact structure and inexpensive manufacture is guaranteed.

According to the invention that object is attained by a tank module for a tank according to the features recited in claim 1.

The present invention thus concerns a tank module for insertion into an opening region of a tank for storing a fluid. The tank module includes a housing which can be inserted into a lower part of the tank and has an outlet region, a filter device for filtering the fluid in the tank, and a pump device arranged in the outlet region for conveying the fluid to the outlet region, wherein the pump device is arranged at least partially within the filter device.

The arrangement according to the invention makes it possible to achieve a compact structure as a pump which is comparatively small in its dimensions is arranged with preferably an electric drive in conjunction with a filter in the outlet region or take-off region for the fluid. The fluid flowing into the tank module from the tank reaches the filter device arranged entirely or partially around the pump device. Thus the pump device is in good contact with the fluid so that in the event of heating of the fluid being required the waste heat liberated in operation of the pump device can be used to heat the fluid. There is also the possibility of the waste heat of at least one magnetic coil of the pump device being absorbed by the fluid so that in normal operation of the pump device the fluid flowing around the magnetic coil provides for sufficient continuous cooling of the pump device.

Arranging the pump device at the filter device or within same means that the tank module can be of a very compact structure, while in particular production is simplified as assembly implementation within the tank after insertion of the tank module into an opening of the tank and also outside the tank is no longer required. The module can be produced completely and in operational form outside the tank in regard to its individual parts and fitted in the form of a module in its entirety. Thus the tank module as a whole can be fitted into the tank without further subsequent work. In that respect the operable module can be easily tested substantially as an entire unit outside the tank.

Further configurations of the present invention are recited in the appendant claims.

In the tank module the fluid can flow through the pump device within the filter device. The pump device can be an electromagnetically driven pump.

In addition the pump device can have at least one magnetic coil and the at least one magnetic coil can have fluid flowing therearound, in which case the waste heat of the at least one magnetic coil can be transferred to the fluid.

The at least one magnetic coil of the pump device can have connecting lines which are passed fluid-tightly out of the fluid region of the housing. The connecting lines can also be connected to a control unit disposed, in a part of the housing.

The invention can further have a valve device arranged between the pump device and the outlet region.

In addition in the tank module the filter device can entirely or at least partially enclose the pump device.

The tank module can also have a heating device arranged in the housing adjacent to the filter device for heating or thawing the fluid in the region surrounding the filter device.

BRIEF DESCRIPTION OF THE DRAWINGS

The invention is described in greater detail hereinafter by means of preferred embodiments with reference to the accompanying Figures in which.

DETAILED DESCRIPTION

Description of Preferred Embodiments

Figure 1:
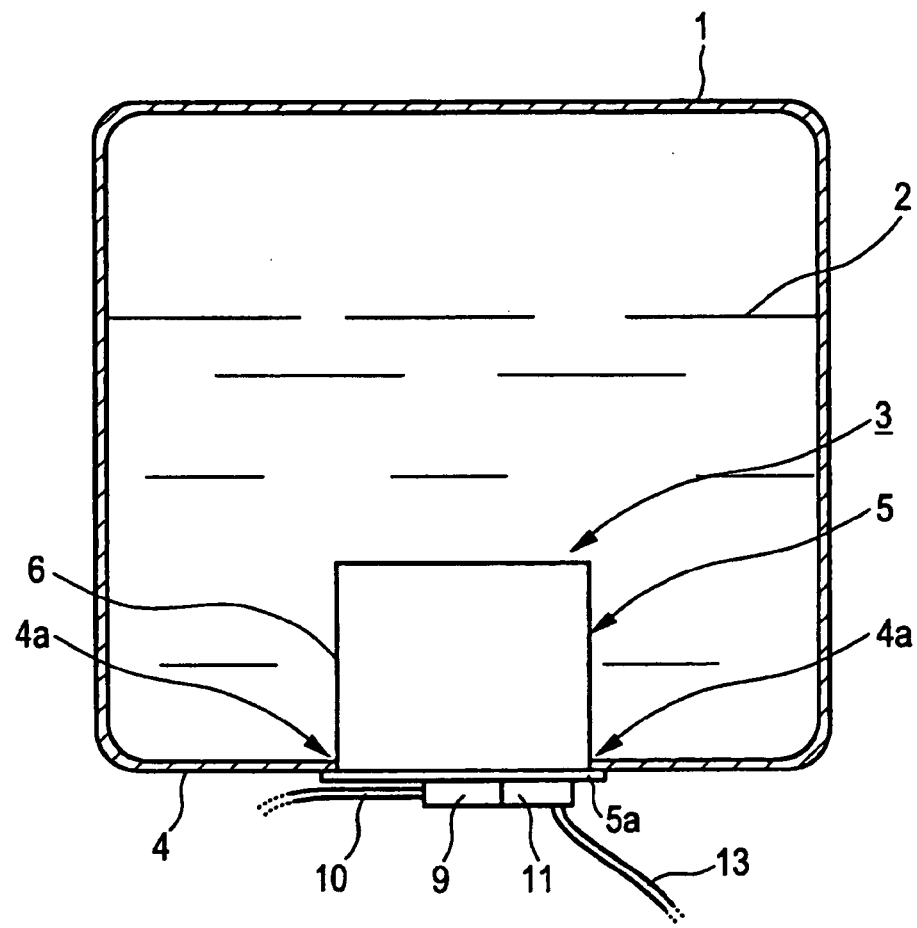
FIG. 1 shows an overall view in the form of a partial section of a tank for storing a fluid, into which the tank module according to the present invention is inserted.

FIG. 1 is a partially sectional view of a tank 1 in a general arrangement as can be disposed for example in a motor vehicle, or in another piece of equipment such as an industrial machine or the like, and wherein a fluid such as for example a fuel or a fluid reducing agent can be stored in the tank to be taken therefrom.

The description hereinafter relates by way of example to the arrangement of the tank for storing a fluid and specifically a fluid reducing agent like for example a fluid urea solution, although the present invention is not restricted thereto and the tank module according to the invention can be used in any containers or tanks, irrespective of what kind of a fluid is stored in the respective container or tank.

The tank 1 in the view in FIG. 1 is entirely or partially filled with the fluid 2. Thus the tank 1 has a given filling level in regard to the fluid 2. The fluid 2 generally involves a filling level higher than the height of the tank module 3 so that at least the tank module 3 has the fluid flowing completely therearound and fluid 2 is disposed in the interior of the tank module 3. The fluid is thus in a fluid region of the tank module 3.

The tank module 3 in the view in FIG. 1 is inserted into the tank 1 and is disposed substantially in the lower part of the tank 1. Preferably the tank module is inserted from below into an at least partially flat bottom surface or bottom element 4 of the tank and suitably fixed. The tank module 3 is sealed off in relation to issuing fluid 2, with respect to the tank 1 or the bottom element 4. An insertion opening 4a in the bottom element 4 is thus of such a configuration that predetermined sealing elements can be arranged between the bottom element 4 and the tank module 3. In the inserted condition a flange region 5a bears against the bottom element 4 and is correspondingly sealed off and fixed. The sealing and fixing elements are not shown in detail in the Figures for the sake of simplicity of the views.

Figure 2:
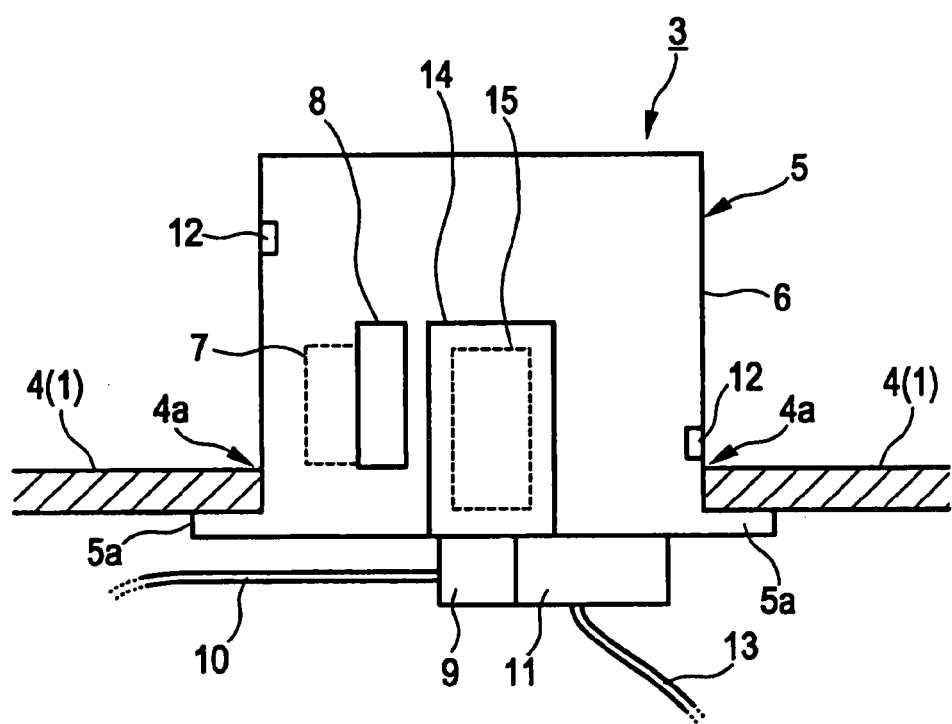
FIG. 2 shows a diagrammatic partial sectional view of the tank module fitted into the tank with functional regions.

FIG. 2 shows to diagrammatic simplified view of the tank module 3 inserted into an opening in the bottom element 4, the tank module 3 having individual functional elements which are further described hereinafter.

As shown in FIGS. 1 and 2 the tank module 3 has a substantially upwardly open and thus approximately pot-shaped housing 5 which is at least partially cylindrical and has a peripherally extending side wall 6. Disposed in the peripherally extending side wall 6 is at least one flow opening 7, through which the fluid 2 can flow into the interior of the housing 5 of the tank module 3. That is important when the level of the fluid 2 is lower than the height of the housing 5 or the side wall 6 of the tank module 3. Preferably there are a plurality of flow openings 7.

In addition arranged within the housing 5 is a heating device 8, by means of which the fluid 2 can be heated in specifically targeted fashion in dependence on the temperature of the fluid or an ambient temperature so that chemical and/or physical changes in the fluid can be substantially avoided. In particular a fluid which becomes solid or separates into flakes at low ambient temperatures can be liquefied (thawed) again by means of the heating device 8.

Referring to FIGS. 1 and 2 provided in the lower part of the housing 5, as shown in the Figures, there is an outlet region 9, by way of which the fluid 2 can flow out of the tank module 3 and thus out of the tank and can be taken therefrom. An outlet tube 10 or a corresponding outlet hose can be arranged at the outlet region 9. The fluid 2 can be passed to a consumption point by way of the outlet region 9 and the outlet tube 10 as well as further tube or hose connections. By way of example in the case of a fluid reducing agent the latter can be fed to the exhaust gas system of an internal combustion engine.

Figure 3:
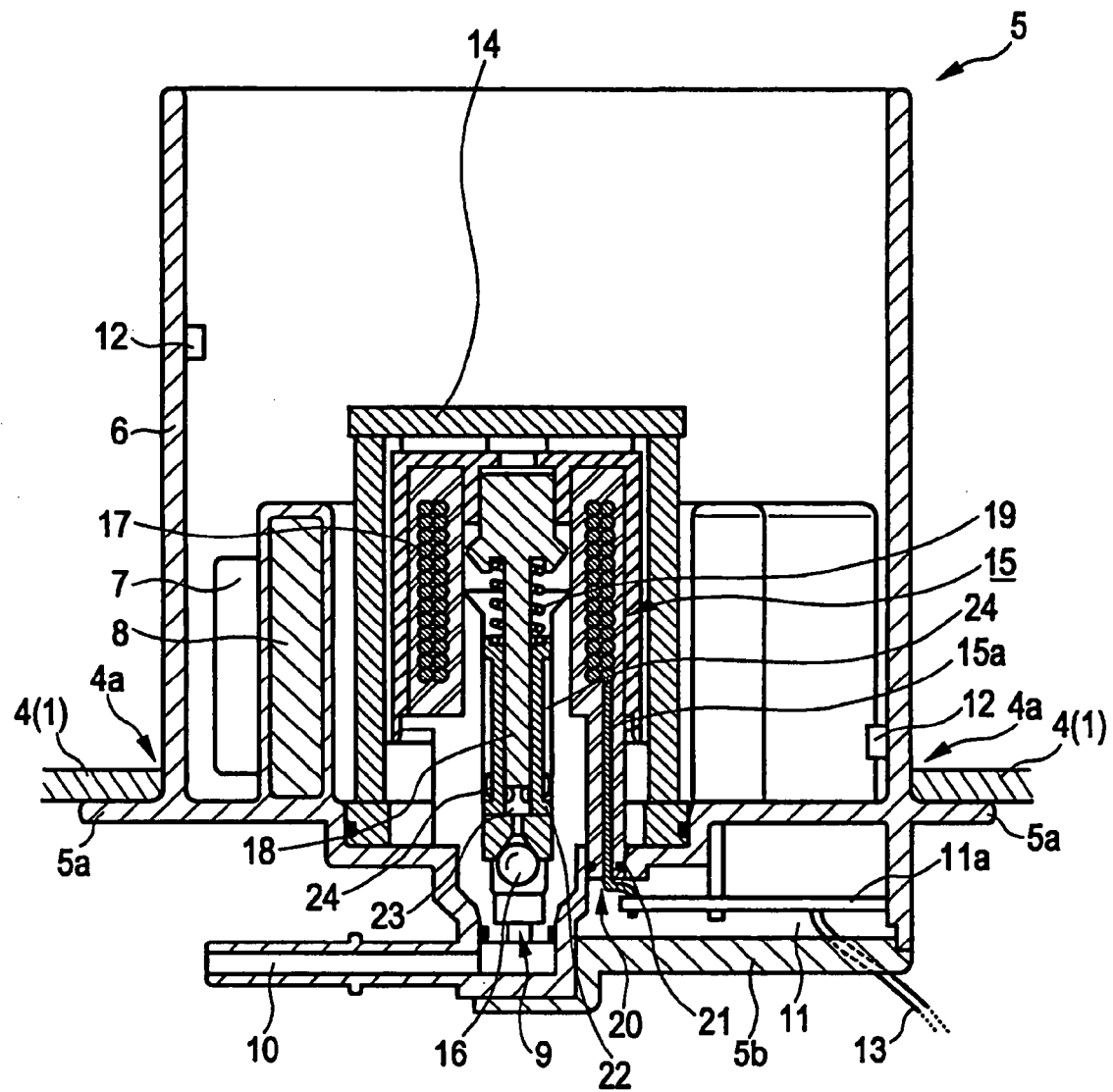
FIG. 3 shows a sectional view of FIG. 2 with further details of the tank module.

Arranged in the proximity of the outlet region 9, preferably in its own separate housing as a (separate) part of the housing 5, is a control unit 11 in which for example electronic components for performing the corresponding control tasks can be arranged on a printed circuit board 11a or card. The heating device 8 is connected for example to the control unit 11 so that the heating device 8 can be supplied with suitable electric power or energy by way of the control unit 11. In that case the feed of electric power can be effected in dependence on the ambient conditions and can be controlled or regulated in specifically targeted fashion by the control unit 11. For the sake of simplicity of the drawing connecting lines to the heating device 8 are shown in FIG. 3 which is described hereinafter.

To detect ambient conditions and in particular the temperature both of the fluid 2 and also of the environment of the tank 1 there are temperature sensors 12. In the view in FIG. 2 there is for example at least one temperature sensor 12 or also a plurality of temperature sensors 12 which communicate corresponding detection results to the control unit 11 so that temperature-dependent control of the heating power of the heating device 8 is possible. When the arrangement has a plurality of temperature sensors they can be arranged at different locations in the tank module 3 or in the tank 1 and also outside the tank 1.

Furthermore the heating power can also be additionally controlled in dependence on the filling level of the fluid 2, in which case a sensor device not shown) can be arranged in the housing 5 of the tank module 3, by means of which the actual filling amount of fluid 2 in the tank 1 is detected. For that purpose generally an ultrasound transmitter and an ultrasound receiver are used in combination, and the filling level can be determined, wherein the filling amount in the tank 1 can be inferred from the filling height, in conjunction with known dimensions of the tank 1. Those detection signals can also be passed to the control unit 11.

Further devices (not shown) can also be connected to the control unit 11, wherein the control unit 11 can be connected in particular by way of connecting lines 13 to a central control device (not shown) which is arranged outside.

The outlet region 9 or a corresponding outlet opening is preferably disposed in the center of the lower part of the housing 5 and arranged in the proximity of the outlet region 9 is a filter device 14, by means of which the fluid 2 which flows through the outlet region 9 on being taken from the tank is filtered in regard to possible impurities so that only cleaned fluid 2 can be passed to the point of consumption.

Arranged within the filter device 14 above the outlet region 9 in the lower part of the housing 5 is a pump device 15, by means of which the fluid 2 can be taken from the tank 1 in a predetermined amount in dependence on a suitable control. The pump device 15 which will be described in detail hereinafter can be in the form of an electrically driven pump or an electromagnetically driven pump and can be connected to the control unit 11 by suitable connecting or junction lines 15*a*. Electric power can thus be fed to the pump device 15 by the control unit 11 in suitably controlled fashion so that the pump output can be controlled in dependence on further criteria like a need for fluid 2 at the point of consumption.

The present invention is not restricted to arranging the pump device within the filter device 14, but rather a suitably designed filter device 14 can also be arranged in the outlet region 9 downstream of the pump device 15 in the direction of flow when taking fluid from the tank, or the filter device can be divided into a first filter device for coarse impurities and a second filter device (which can be provided downstream of the pump device 15 in the direction of flow) for finer impurities.

The pump device 15 is at least partially disposed in the filter device 14 and is substantially enclosed by the filter device 14, that is to say the filter device 14 at least partially surrounds the pump device 15, but in such a way that only filtered fluid is fed to the pump device. If for example the pump device 15 is disposed at a side region of the filter device 14 and thus forms an edge region of the latter then the respective boundary regions, that bear against each other, of the filter device 14 and the pump device 15 are of such a configuration as to provide for sealing off the fluid 2.

In the present embodiment an arrangement is described, in which the pump device 15 is advantageously disposed within the filter device 14 in the outlet region 9 of the tank module 4 and thus the filter device 14 completely encloses the pump device 15.

For further description of the arrangement and the mode of operation of the pump device 15 attention is directed to FIG. 3 which in the form of a diagrammatic partial section shows the arrangement of the above-described elements and components in the tank module 3.

In the arrangement shown in FIG. 3 the heating device 8 is arranged in the housing 5 of the tank module 3 at one side in the housing 5, for example in the proximity of one of the flow openings 7 in the side wall 6. The fluid 2, in particular at very low ambient temperatures, can be suitably heated up or also thawed by means of the heating device 8. The fluid 2 can flow into the interior of the filter device 14 by way of the substantially cylindrical or parallelepipedic arrangement of the filter device, the pump device 15 being arranged in the interior of the filter device 14. The pump device 15 is positioned over the outlet region 9 or in the proximity thereof so that, in operation of the pump device 15 the fluid can be taken off by way of the outlet region 9 and the outlet tube 10. Arranged in the outlet region 9 between the pump device 15 and the outlet tube 10 is a valve device 16, by means of which a flow through the outlet region 9 of the fluid 2 can be reduced or terminated in controlled fashion.

In this arrangement the valve device 16 can be in the form of an electromagnetic valve with controllable actuation, or also simply in the form of a spring-loaded valve, the rest position of which is the closed position of the valve.

The pump device 15 includes in detail at least one or more magnetic coils 17 adapted to produce a magnetic field, by means of which a piston 18 arranged in the interior of the pump device 15 can be moved. A spring device 19 can move the piston 18 into a preferred position, and the piston 18 can be moved against the spring force of the spring device 19 by means of the magnetic field produced by the at least one magnetic coil 17.

The at least one magnetic coil 17 is connected to the control unit 11 and is supplied with a suitable electric power in controlled or regulated fashion to produce the pump action. The connecting lines 15*a* of the at least one magnetic coil 17 are passed within the housing 15 from the region within the valve device 16 to the separate housing portion of the control unit 11, wherein there is provided a suitable passage section 20 from the region in the filter device 14 (that is to say the fluid region of the tank module 3) to the control unit 11 in the separate housing portion and the connecting lines 15*a* are passed through in sealed relationship. Sealing in relation to fluid 2 flowing therethrough can be effected by means of a suitable elastic sealing material or also for example by means of an O-ring 21.

The piston 18 of the pump device 15 moves in a piston guide 22, within which the pump chamber 23 or the delivery volume of the pump device 15 is determined, in conjunction with all the dimensions of the piston 18 and the properties of the spring device 19. Arranged in the piston guide 22 are suitable inlet openings 24, by way of which the fluid 2 can flow into the chamber 23 of the pump device 15.

In operation of the pump device 15 therefore fluid 2 flows out of the tank 1 into the housing 5 through the flow openings 7 and is heated by the heating device 8 in dependence on the requirements involved and the ambient temperatures. The fluid 2 flows through the filter device 14 into the interior of the filter device 14 and thus into the pump device 15. In particular the fluid 2 flows by way of the inlet openings 24 into the chamber 23 of the pump device 15 so that the appropriate amount of fluid is delivered in operation of the pump device 15. In that case the delivery amount of the fluid 2 flows by way of the valve device 16 in the outlet region 9 to the point of consumption by way of the outlet tube 10.

The above-described arrangement as shown in FIG. 3 affords operational advantages and greater ease of manufacture, in particular simplified assembly of the components involved in the tank module 3.

In regard to the operational advantages the above-described arrangement is of a comparatively simple structure. The pump device 15 includes the at least one magnetic coil 17 which is preferably cast by means of a plastic or a resin so that this ensures on the one hand mechanical stability and on the other hand electric insulation. The casting material for the at least one magnetic coil 17 is resistant in relation to the physical and chemical properties of the fluid 2. Insofar as structurally possible, the fluid 2 can flow around the at least one magnetic coil 17. The heat generated in operation of the at least one magnetic coil 17 can thus be delivered to the fluid 2 disposed in the interior of the pump device 15 so that the waste heat of the at least one magnetic coil 17 can also be used to heat the fluid 2. In addition absorption of the waste heat from the at least one magnetic coil 17 provides for continuous cooling of the magnetic coil 17, irrespective of the need for heating the fluid 2, so that overheating of the at least one magnetic coil 17 and thus the pump device 15 is effectively obviated.

The at least one magnetic coil 17 can be easily cast by means of the resin, in which case the overall arrangement of the magnetic coil 17, in relation to the connecting lines 15a, has a prolongation part which projects in sealed relationship in the above-described manner out of the housing 5 into the region of the control unit 11 by way of the passage section 20. The connecting lines 15a are connected to the control device 11 and in particular to a printed circuit board 11a or card, on which components of the control device 11 are arranged. The fluid 2 substantially flows around the further components of the pump device 15.

In regard to simplified manufacture after insertion of the pump device 15 the filter device 14 can be arranged thereover. The preferably cylindrical filter device 14 can thus be easily fitted over the pump device 15. The region around the heating device 8 and the region within the filter device 14 and the pump device 15 can be suitably heated by means of the heating device 8 arranged in the proximity of the filter device 14, wherein in addition heating of the fluid 2 is effected in the interior of the pump device 15 by the waste heat from the at least one magnetic coil 17. The fluid 2 flowing directly around the at least one magnetic coil 17 thus passes into good contact with the magnetic coil 17 producing corresponding waste heat so that this ensures good heat transfer both for heating the fluid 2 and also for cooling the at least one magnetic coil 17.

The above-described arrangement of the tank module 3 can thus be produced and pre-assembled in a very simple fashion so that further assembly operations after insertion of the tank module 3 into the tank 1 directly on the tank 1 or on the tank module 3 are no longer required. The separate housing portion beneath the housing 5 and substantially outside the tank 1 in the inserted position of the tank module 3 (for receiving the control unit 11) can be covered over by a cover element 5b. As, in conjunction with the passage section 20, the connecting lines 15a of the at least one magnetic coil 17 are passed in fluid-tight relationship in the above-described fashion through the passage section 20 (that is to say out of the fluid region of the housing 5) the region of the control unit 11 can be easily closed with the cover element 5b. The printed circuit board or assembly of the control unit 11 is easily accessible by way of the removable cover element 5b and is additionally arranged in fluid-tight and thus protected relationship from all sides.

Semiconductor components provided in the control unit 11 and arranged specifically on the printed circuit board 11a can bear against the lower bottom surface of the tank module 3 and in that way can deliver their waste heat in operation by way of the bottom surface to the fluid 2 disposed thereabove so that cooling of the semiconductor components is guaranteed and further heat can be supplied for heating the fluid 2.

The tank module 3 according to the present invention can thus be completely pre-assembled in conjunction with economic manufacture except for further connections to the outlet tube 10 and the required connections of the connecting lines 13 from the control unit 11 to an external control apparatus, and can be tested in that condition as a complete unit so that thereafter the substantially pot-shaped housing 5 can be fitted into the tank 1 as the last working operation. As is shown in the Figures the flange region 5a of the housing 5 can bear against the bottom element 4 of the tank 1 and can be sealed at the connecting location between the flange region 5a and the bottom surface 4 so that no fluid 2 can escape in unwanted fashion.

After being inserted into the tank 1 the housing 5 of the tank module 3 can be welded or glued to the tank insofar as this is possible in regard to the materials used and the nature of the respective surfaces. That can lead to a considerable simplification in manufacture as the parts can be joined together with comparatively little effort. In addition after welding or glueing the tank module 3 is mechanically and thus permanently and reliably connected to the tank 1 so that those connections can also stand up to the increased loadings in industrial applications or for example in operation of a motor vehicle involving severe vibration.

In the present example the tank 1 is shown in the view in FIG. 1 in the form of a substantially box-shaped structure. The present invention however is not restricted thereto as the tank module 3 according to the invention can be inserted into a tank 1 of any shape, provided that the tank 1 has a suitable opening (for example the opening region 4a) in its lower region and the tank module 3 is disposed substantially in a lower part of the respective tank 1 and the feed flow of fluid 2 in the tank 1 to the tank module 3 is ensured. In addition the tank 1 can have further openings (not shown), for example for filling the tank 1 with fluid 2.

It is possible in that way to obtain a very compact and easily replaceable tank module 3, in respect of which maintenance, repair and replacement are also relatively easily possible having regard to the technical advance involved.

The present invention is not limited to the use of a piston pump as the pump device 15, but rather it is also possible to use flow pumps with rotating elements.

The present invention was described hereinbefore by means of embodiments by way of example with reference to the accompanying Figures.

It will be self-evident to the man skilled and active in this art however that the configuration of the present invention according to the described Figures and the references used for the respective parts and components in the Figures and the description as well as the details given by way of example are not to be interpreted restrictively.

The shapes and proportions set forth in the individual Figures are also shown diagrammatically and in simplified form for better understanding. The invention is not restricted to the indicated views and in particular the dimensions and shapes.

Rather all embodiments and variants which fall within the accompanying claims are deemed to be part of the invention.

The invention claimed is:

1. A tank module for insertion into an opening region of a tank for storing a fluid, comprising
- a housing which can be inserted into a lower part of the tank and has an outlet region,
- a filter device for filtering the fluid in the tank,
- a pump device arranged in the outlet region of the tank for conveying the fluid to the outlet region, wherein the pump device has the fluid flowing therethrough within the filter device,
- wherein the pump device arranged in the outlet region of the tank is entirely enclosed by the filter device and the pump device is fully inserted into the filter device, and
- a control unit having semiconductor components on a printed circuit board bearing against a lower bottom surface of the tank module to deliver their waste heat in operation by way of the bottom surface to the fluid so that cooling of the semiconductor components is guaranteed and further heat can be supplied for heating the fluid.

2. A tank module as set forth in claim 1 wherein the pump device is an electromagnetically driven pump.

3. A tank module as set forth in claim 2 wherein the pump device has at last one magnetic coil and fluid flows around the at least one magnetic coil, wherein the waste heat of the at least one magnetic coil is fed to the fluid.

4. A tank module as set forth in claim 3 wherein the at least one magnetic coil has connecting lines which are passed fluid-tightly out of a fluid region of the housing.

5. A tank module as set forth in claim 4 wherein the connecting lines are connected to the control unit disposed in a part of the housing.

6. A tank module as set forth in claim 5 and further comprising a valve device arranged between the pump device and the outlet region.

7. A tank module as set forth in claim 1 and further comprising a heating device arranged in the housing adjacent to the filter device for heating or thawing the fluid in the region around the filter device.

8. A tank module as set forth in claim 1 and further comprising a valve device arranged between the pump device and the outlet region.

9. A tank module for insertion into an opening region of a tank for storing a fluid, comprising
- a housing which can be inserted into a lower part of the tank and has an outlet region,
- a filter device for filtering the fluid in the tank, and
- a pump device arranged in the outlet region of the tank for conveying the fluid to the outlet region, wherein the pump device has the fluid flowing therethrough within the filter device,
- wherein the pump device arranged in the outlet region of the tank is entirely enclosed by the filter device and the pump device is fully inserted into the filter device, and
- wherein the pump device is an electromagnetically driven pump,
- wherein the pump device has at least one magnetic coil positioned within the pump device so that fluid flows directly around the at least one magnetic coil so that waste heat of the at least one magnetic coil is delivered to the fluid that is conveyed to the outlet region of the housing, and
- a control unit having semiconductor components on a printed circuit board bearing against a lower bottom surface of the tank module to deliver their waste heat in operation by way of the bottom surface to the fluid so that cooling of the semiconductor components is guaranteed and further heat can be supplied for heating the fluid.

10. A tank module as set forth in claim 9 wherein the at least one magnetic coil has connecting lines which are passed fluid-tightly out of a fluid region of the housing.

11. A tank module as set forth in claim 10 wherein the connecting lines are connected to the control unit disposed in a part of the housing.

12. A tank module as set forth in claim 11 and further comprising a valve device arranged between the pump device and the outlet region.

13. A tank module as set forth in claim 9 and further comprising a heating device arranged in the housing adjacent to the filter device for heating or thawing the fluid in the region around the filter device.

* * * * *